(12) United States Patent (10) Patent No.: US 12,695,263 B2
Kane et al. (45) Date of Patent: Jul. 28, 2026

(54) LASER RESONATOR ASSEMBLY

(71) Applicants: Thomas James Kane, Menlo Park, CA (US); John Lawrence Nightingale, Portola Valley, CA (US)

(72) Inventors: Thomas James Kane, Menlo Park, CA (US); John Lawrence Nightingale, Portola Valley, CA (US)

( * ) Notice: Subject to any disclaimer, the term of this patent is extended or adjusted under 35 U.S.C. 154(b) by 1000 days.

(21) Appl. No.: 17/902,764

(22) Filed: Sep. 2, 2022

(65) Prior Publication Data

US 2023/0071683 A1 Mar. 9, 2023

Related U.S. Application Data

(60) Provisional application No. 63/240,831, filed on Sep. 3, 2021.

(51) Int. Cl.

| | |
|---|---|
| *H01S 3/02* | (2006.01) |
| *H01S 3/04* | (2006.01) |
| *H01S 3/042* | (2006.01) |
| *H01S 3/06* | (2006.01) |
| *H01S 3/1115* | (2023.01) |
| *H01S 3/113* | (2006.01) |
| H01S 3/0941 | (2006.01) |

(52) U.S. Cl.
CPC ............ *H01S 3/025* (2013.01); *H01S 3/0405* (2013.01); *H01S 3/042* (2013.01); *H01S 3/0623* (2013.01); *H01S 3/1115* (2013.01); *H01S 3/113* (2013.01); *H01S 3/09415* (2013.01)

(58) Field of Classification Search
CPC ................................ H01S 3/025; H01S 3/113
See application file for complete search history.

(56) References Cited

U.S. PATENT DOCUMENTS

| | | | | | |
|---|---|---|---|---|---|
| 4,847,858 | A | * | 7/1989 | Brumme | H01S 3/086 |
| | | | | | 372/20 |
| 4,930,887 | A | * | 6/1990 | Burns | H01S 3/083 |
| | | | | | 250/233 |
| 5,907,570 | A | * | 5/1999 | Nighan | H01S 3/09415 |
| | | | | | 372/75 |
| 6,002,695 | A | * | 12/1999 | Alfrey | H01S 3/109 |
| | | | | | 372/22 |
| 6,501,772 | B1 | * | 12/2002 | Peterson | H01S 3/23 |
| | | | | | 372/66 |
| 7,119,972 | B2 | * | 10/2006 | Prince | G02B 7/1805 |
| | | | | | 359/833 |
| 7,839,904 | B1 | * | 11/2010 | Equall | G01S 7/4814 |
| | | | | | 372/27 |
| 9,379,519 | B2 | * | 6/2016 | Eno | H01S 3/094038 |
| 2002/0097756 | A1 | * | 7/2002 | Nettleton | H01S 3/1083 |
| | | | | | 372/10 |

(Continued)

*Primary Examiner* — Michael Carter

(57) ABSTRACT

A laser resonator assembly and a method of assembly of the laser resonator assembly are described. The laser resonator assembly has a gain element and an output coupler that are placed in a gain element frame and output coupler frame, respectively. The output coupler may also be a saturable absorber element so that the laser resonator assembly emits Q-switched pulses. The frames provide heat dissipation and can be easily aligned and permanently affixed in an appropriate alignment. A laser using the laser resonator assembly can be assembled in a low-cost manner.

19 Claims, 7 Drawing Sheets

(56)                    References Cited

U.S. PATENT DOCUMENTS

| | | | |
|---|---|---|---|
| 2006/0159132 A1* | 7/2006 | Young | H01S 3/09415 |
| | | | 372/25 |
| 2009/0016385 A1* | 1/2009 | Sakai | H01S 3/08036 |
| | | | 372/11 |
| 2009/0213882 A1* | 8/2009 | Weida | G01N 21/3504 |
| | | | 372/29.011 |
| 2013/0128908 A1* | 5/2013 | Battis | H01S 3/025 |
| | | | 372/39 |
| 2013/0250986 A1* | 9/2013 | Wunderer | H01S 5/18361 |
| | | | 372/49.01 |
| 2020/0251874 A1* | 8/2020 | Myers | H01S 3/0401 |

* cited by examiner

600

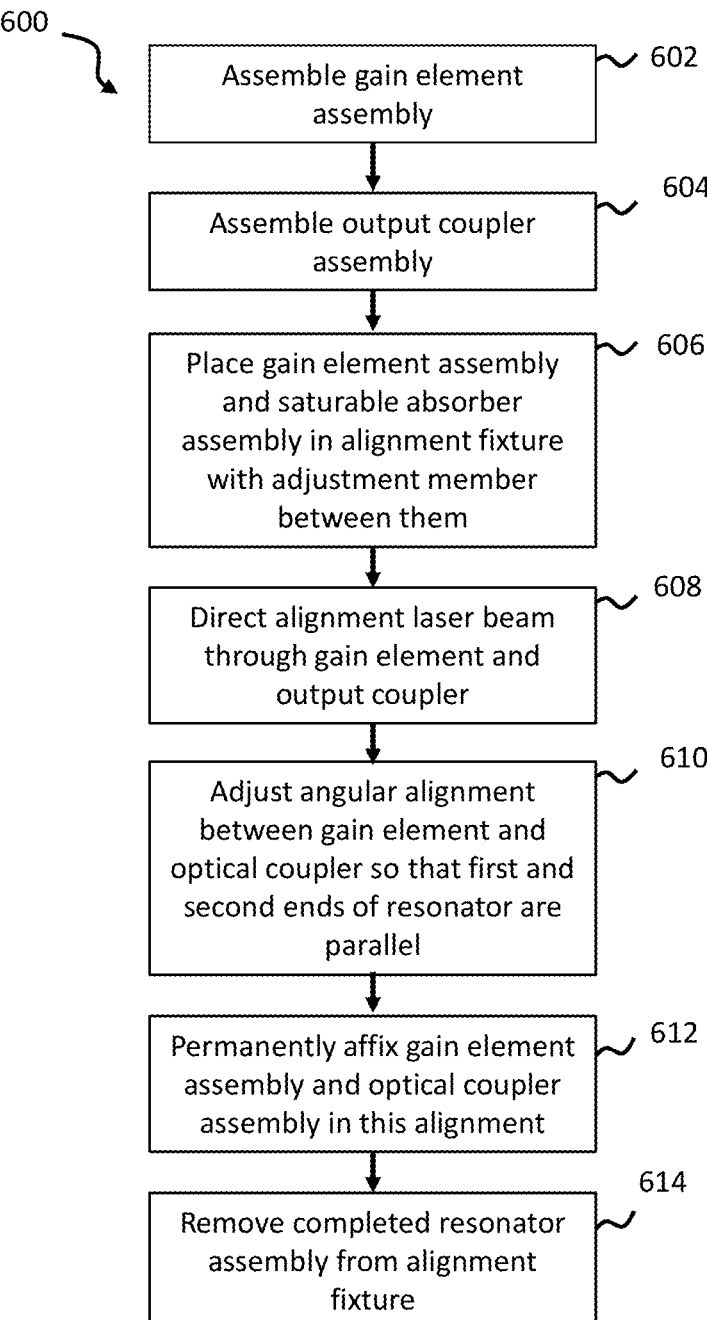

602 Assemble gain element assembly

604 Assemble output coupler assembly

606 Place gain element assembly and saturable absorber assembly in alignment fixture with adjustment member between them 608 Direct alignment laser beam through gain element and output coupler 610 Adjust angular alignment between gain element and optical coupler so that first and second ends of resonator are parallel 612 Permanently affix gain element assembly and optical coupler assembly in this alignment 614 Remove completed resonator assembly from alignment fixture

*FIG. 7*

LASER RESONATOR ASSEMBLY

CROSS REFERENCE TO RELATED APPLICATIONS

This application claims priority to U.S. Provisional Patent Application No. 63/240,831, entitled "LASER RESONATOR ASSEMBLY," filed Sep. 3, 2021 which is incorporated herein in its entirety for all purposes.

FIELD OF THE INVENTION

The present invention relates to laser resonators and their method of assembly.

BACKGROUND

Most lasers resonators have a single gain medium surrounded by two mirrors, a high reflecting mirror and an output coupling mirror forming a laser cavity. Laser operation is enabled by having the reflective surfaces of these two mirrors precisely aligned so that the mirrors reflect a signal back and forth through the gain medium. If gain in the gain medium is sufficient to overcome losses in the laser cavity, the laser will lase.

A particularly simple and low-cost laser for generating pulses with high peak power is a diode-pumped gain element with a saturable absorber element in the laser cavity. Both the gain element and saturable absorber element may be a small rectangular parallelepiped. The high reflecting mirror may be placed on an outer surface of the gain element and a partially transmitting output coupling surface on an outer surface of the saturable absorber element.

Adjusting the high reflecting mirror and the output coupler so that they have the correct angular alignment can be challenging. Depending on the resonator design, relative angular tolerances between the mirrors may be less than 1 milliradian. This alignment must be maintained over the laser's operating lifetime and operating temperature range. In addition, the laser must be packaged so that waste heat can be removed from the gain element, saturable absorber element, and pump laser.

What is needed is a laser and resonator assembly design and fabrication method that enables low-cost manufacturing.

SUMMARY

In one embodiment, a laser resonator assembly is disclosed. The laser resonator assembly includes a gain element having a first and a second surface and an output coupler element having a first and second surface. A first end of the resonator is formed by a highly reflective coating at a lasing wavelength on the first surface of the gain element. A second end of the resonator is formed by a partially transmitting optical coating on the first or second surface of the output coupler. A gain element frame secures the gain element, and an output coupler frame secures the output coupler.

In another embodiment, a method of assembly of a laser resonator assembly is disclosed. The method includes assembling a gain element assembly from a gain element and a gain element frame, a first end of the laser resonator being on a surface of the gain element. The method further includes assembling an output coupler assembly from an output coupler and an output coupler frame, a second end of the laser resonator being on a surface of the output coupler. The gain element assembly and the output coupler assembly are then placed in an alignment fixture with an adjustment member mechanically connecting the gain element assembly and the output coupler assembly. An angular alignment between the gain element and the output coupler is adjusted so that the first end of the laser resonator is parallel to the second end of the laser resonator. The gain element assembly and the output coupler assembly are then permanently affixed in this alignment.

BRIEF DESCRIPTION OF THE DRAWINGS

The invention and the advantages thereof, may best be understood by reference to the following description taken in conjunction with the accompanying drawings in which:

FIG. 7 is a flowchart depicting a method of assembling a laser resonator according to an embodiment of the present invention.

In the drawings, like reference numerals are sometimes used to designate like structural elements. It should also be appreciated that the depictions in the figures are diagrammatic and not to scale.

DETAILED DESCRIPTION

The present invention relates to methods and systems for manufacturing a low-cost, diode-pumped, solid-state laser. One particularly attractive application for the laser is as a laser source in laser ranging, commonly known as LIDAR. In this application, the laser may be a passively Q-switched laser operating at an eye-safe wavelength, for example, at a wavelength between 1.2 and 1.4 microns. Inclusion of a saturable absorber material within the laser cavity causes the laser to passively Q-switch, resulting in a pulsed output with high peak powers, which is useful in time-of-flight ranging applications. The saturable absorber may be based on vanadium ions in a crystalline or glass material. The gain material may be neodymium ions doped in a crystalline or glass material. Alternatively, the diode-pumped solid-state laser may be a frequency tunable laser that may be used in a frequency-modulated, continuous-wave (FMCW) LIDAR system. A frequency of the frequency tunable laser may be adjusted by varying a resonator length of the laser with a piezoelectric element or by some other means.

Figure 1:
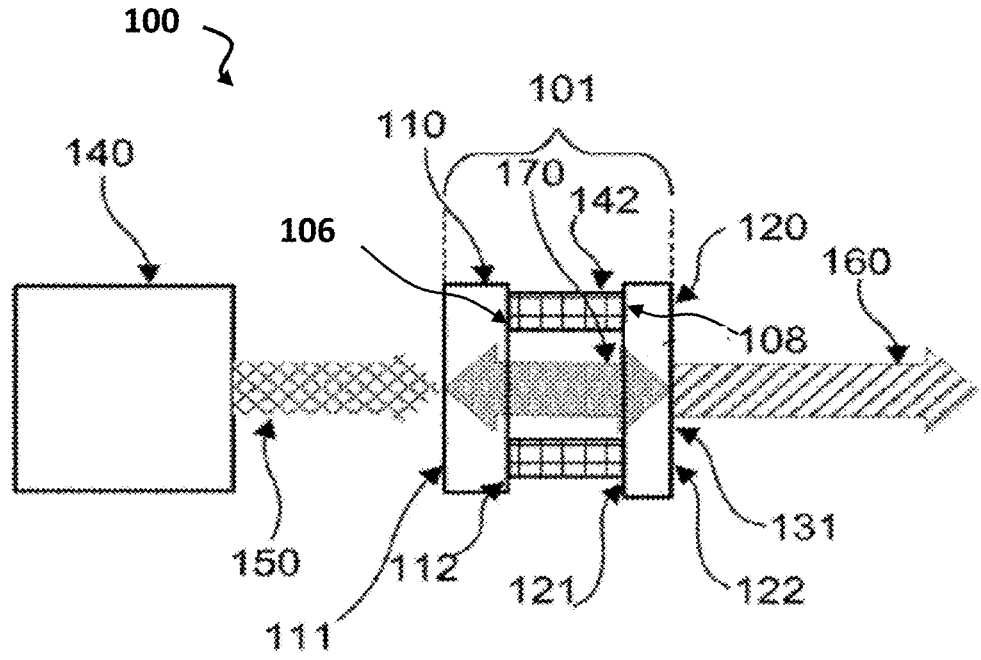
FIG. 1 is a schematic cross-sectional diagram of a prior art, passively Q-switched laser.

FIG. 1 depicts a prior art passively Q-switched laser 100 disclosed in U.S. patent application publication No. 20200412080. This patent application has the same inventors as the present invention. There are two elements that form a laser resonator 101, a gain element 110 and a saturable absorber element 120. Optical coatings are applied to the two large surfaces of the gain element 110. A first surface 111, which forms one end of the laser resonator, is coated for high transmission at a pump wavelength and for high reflectivity at a lasing wavelength. The lasing wavelength may be approximately 1.34 μm if the gain element 110 is formed from Nd:YVO$_4$. A second surface 112, opposing the first surface 111, is coated for high transmission at the laser wavelength. A partially transmitting optical coating 131 is applied to the second surface 122 of the saturable absorber element 120 to form an output coupler that serves as an end mirror for the resonator 101. The first surface 121 of the saturable absorber is anti-reflection coated at the laser wavelength. All the optical surfaces 111, 112, 121, and 122 may be flat, that is they may have no deliberately fabricated curvature. Curvature of one or more of these surfaces may be induced by application of an optical coating to the surface or by thermal effects when the resonator 101 is energized by a pump beam 150 generated by a pump source 140. All other surfaces of the gain element 110 and saturable absorber element 120 are non-optical surfaces which are not arranged to transmit light. These non-optical surfaces may also be flat, but they do not need to be optically polished.

The resonator 101 uses a spacer 142 with the gain element 110 attached to a first side 106 of the spacer 142 and the saturable absorber 120 attached to a second, opposing side 108 of the spacer 142. The spacer 142 has features that allow it to bend such that the alignment of the second surface 106 of the gain element 110 with the first surface 108 of the saturable absorber element 120 may be adjusted. This adjustment also changes the alignment of the first surface 111 of the gain element 110 with the second surface 122 of the saturable absorber 120. The spacer 142 serves to seal the laser resonator volume from outside contamination that may degrade laser performance. The resonator volume may be completely sealed, such that it is isolated from the surrounding atmosphere, or it may have a seal that allows pressure equalization between the resonator volume and surrounding atmosphere.

Both the gain element 110 and the saturable absorber element 120 are shaped as a rectangular parallelopiped. The gain element is a neodymium doped YVO$_4$ crystal and the saturable absorber is a vanadium doped yttrium aluminum garnet, (YAG) crystal. The gain element 110 and saturable absorber element 120 must be aligned so that the resonant light 170 reflects off of the two end mirror coatings and returns to the same point. The desired condition of a ray reflecting back on itself indefinitely is achieved by bending the spacer 142 so as to angularly align the second surface 122 of the saturable absorber with the first surface 111 of the gain element 110.

When the intensity of the pump light 150 is sufficient so that the gain element 110 has sufficient gain to overcome any losses within the laser resonator 101, the laser 100 will lase. Resonant light 170 will circulate between the first surface of the gain element 111 and the second surface of the saturable absorber 122. A fraction of the resonant light 170 will emerge through the partially transmitting optical coating 131 to form an output beam 160. Reflectivities of the optical coatings are selected so that the output beam is at the laser wavelength, such as approximately 1.34 microns.

While the prior art resonator design works well in many applications it may be difficult to implement if the size of the gain element 110 and saturable absorber element 120 is very small. A beam size, as measured by a 1/e$^2$ radius, of the resonant light 170 is typically less than 100 microns. If the cross-sectional dimensions of the optical surfaces on the gain element 110 and the saturable absorber 120 are several times larger than the beam size, for example, three to five times larger, optical losses to the resonant light 170 from striking the non-optical surfaces of the gain element 110 and saturable absorber element 120 should be small compared to other cavity losses. Fabricating the gain element 110 and saturable absorber element 120 as small elements may be desirable to reduce cost. Small parts shaped as rectangular parallelepiped may be readily fabricated by dicing a wafer of the gain material and the saturable absorber material. For example, the surface first 111 and the second surface 112 of the gain element 110 may have an area less than approximately 1 square millimeter. Thus, the gain element dimensions in both x and y-directions perpendicular to a z or lasing direction may be less than 1 mm. The first surface 121 of the saturable absorber element 120 where the spacer 142 is attached may have similar dimensions. Thus, the available surface area to contact the spacer 142 is very small. As such, the spacer 142 must be very thin and may be too thin to provide adequate mechanical support to hold the first surface 111 of the gain element 110 and the second surface 122 of the saturable absorber 120 in alignment.

Figure 2:
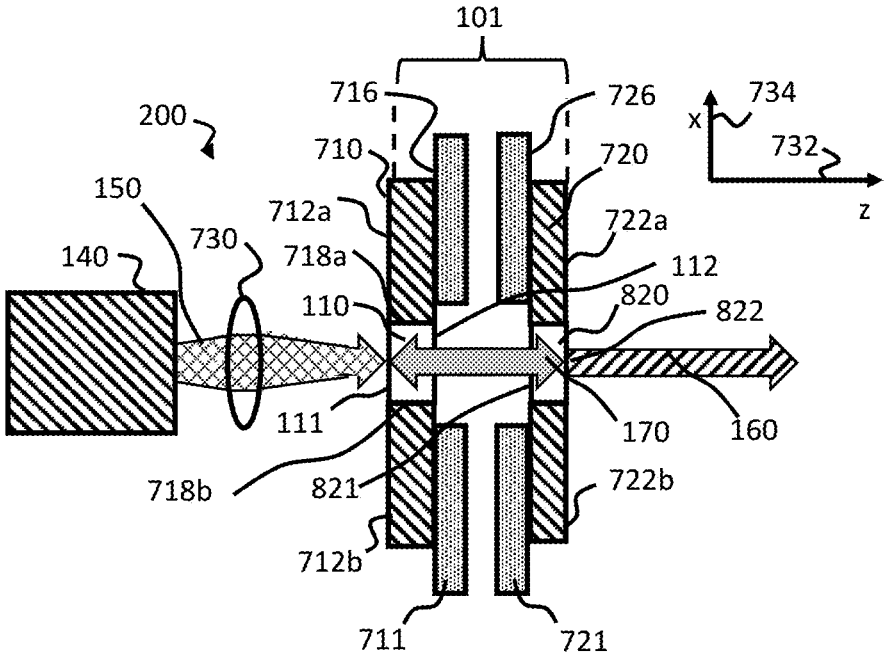
FIG. 2 is a schematic cross-sectional diagram of a laser resonator assembly according to an embodiment of the present invention.

An improved resonator assembly that overcomes this problem is shown in FIG. 2, which shows a cross-sectional view in a x-z plane of a laser 200 according to an embodiment of the current invention. Here the x-direction 734 is perpendicular to a longitudinal, z or lasing direction 732. The laser is similar to the prior art laser depicted in FIG. 1 and for brevity a description of some of the common elements will not be repeated here. As in the prior art, the gain element 110 may be a rectangular parallelepiped with two opposed optical surfaces, 111 and 112, and four non-optical surfaces or equivalently non-optical faces. The highly reflective first surface 111 of the gain element 110 may have a transmission at the pump wavelength greater than approximately 90 or 95% and a reflection at the lasing wavelength may be greater than approximately 98, 99, or 99.5%. The gain element may be Nd:YVO$_4$, Nd:YAG, or any suitable glass, ceramic, or crystalline laser material. The saturable absorber element 120 of the prior art laser resonator assembly may be replaced by an output coupler 820, although in some embodiments the output coupler 820 may also be a saturable absorber element. That is a partially transmitting coating that forms a second end of the laser resonator 101 may be applied to either an output coupler, to obtain a continuous-wave output, or a saturable absorber, to obtain a q-switched output. The output coupler 820 is a separate, discrete element from the gain element 110.

The gain element 110 and the output coupler 820 may be attached to a gain element frame 710 and output coupler frame 720, respectively. As in the prior art, all the optical surfaces, the first and second surfaces of the gain element 110, 111 and 112, respectively, and a first and a second surface of the optical coupler 820, 821 and 822, respectively, may be flat, that is they may have no deliberately fabricated curvature. A first end of the resonator may be located on the first surface 111 of the gain element 110 and the second end of the resonator may be located on either the first surface 821 or second surface 822 of the output coupler 820. If the second end of the resonator is located on the first surface of the output coupler 820 then the material that forms the output coupler is not within the resonator. If the second end of the resonator is located on the second surface 822 of the output coupler 820 then the material that forms the output coupler is within the resonator. This arrangement enables the output coupler 820 to be composed of a saturable absorber material for Q-switched operation or an electrooptic material for frequency tunable operation. As shown in FIG. 2 the second end of the resonator is located on the second surface 822 of the output coupler 820. Both the gain element 110 and the output coupler 820 may be shaped as rectangular parallelopipeds. As such, they may be inexpensively fabricated by dicing individual parts from a previously coated substrate. The cross-sectional dimensions of the optical surfaces 111 and 112 of the gain element 110 and output coupler 820 may be less than 1 or 2 mm or in a range between 0.5 to 2 mm along both the x- and y-axis. The cross-section may be a square shape or may be a rectangle with an aspect ratio in a range between 1:1 to 4:1.

A length of the laser resonator 101 along the z or lasing direction 732 may be in a range between 1 and 10 mm and preferably in a range between 2 and 5 mm. Resonator lengths in this range will more readily operate on a fundamental transverse mode than shorter resonator lengths. Resonator lengths in this range will provide shorter output pulses if the resonator 101 is passively Q-switched and provide a longer continuous tuning range if the laser is a frequency-modulated, continuous-wave laser than longer resonator lengths.

The gain element frame 710 may be composed of a plurality of individual elements that are permanently bonded together and secure the gain element 110 into the gain element frame 710. The gain element frame 710 may consist of three pieces a first gain contact element 712a, a second gain contact element 712b, and a gain joiner 716. The first and second gain contact elements, 712a and 712b, may have a substantially identical thickness in the longitudinal or z-axis direction 732 as the gain element 110. The term substantially identical here means that the elements are the same thickness within manufacturing tolerances, which may be ±0.0005, ±0.001, ±0.002, ±0.005, or ±0.010 inches or some other value. In other embodiments, the first and second gain contact elements 712a and 712b may have a thickness in a range between approximately the thickness of the gain element 110 to twice the thickness of the gain element 110.

The first gain contact element 712a may contact the gain element 110 along a gain element non-optical face 718a. Likewise, the second gain contact element 712b may contact the gain element 110 along an opposed non-optical face 718b of the gain element 110. The gain contact elements 712a and 712b may make direct contact with the gain element 110 or contact may be through a compliant layer (not shown in FIG. 2) positioned between the first and second gain contact elements, 712a and 712b, and the gain element 110. The compliant layer may be formed from a thermally conductivity adhesive or it may be a coating, such as an indium or gold coating, applied to the first and second gain contact elements 712a and 712b or the gain element 110. Alternatively, the first and second gain contact elements 712a and 712b may be formed from a soft material such that no compliant layer is required. The first and second gain contact elements 712a and 712b have high thermal conductivity so waste heat from the gain element 110 can be readily removed. For example, the first and second gain contact elements 712a and 712b may be formed from copper, such as fully annealed, oxygen-free high thermal conductivity copper (OFHC copper). Fully annealed OFHC copper is soft and a compliant layer may not be required with this material.

A gain joiner 716 may be attached to the first and second gain contact elements 712a and 712b and may be used to secure their position. The gain joiner 716 may be attached to the first and second gain contact elements 712a and 712b by any known means or method such as, but not limited to, adhesive bonding, solder, and spot welding. The resultant gain element frame 710 securely holds the gain element 110 forming a gain element assembly 711. The gain element frame 710 provides a thermal path for waste heat and larger surfaces for attachment of the gain element 110 to a resonator assembly as described below.

An advantage of the laser resonator assembly shown in FIG. 2 is that it efficiently dissipates waste heat generated when the gain element 110 is energized by pump beam 150. The thermal conductivity of the gain element 110 is generally much lower than that of the material composing the first and second gain contact elements 712a and 712b. For example, the thermal conductivity of common gain materials, such as Nd:YVO$_4$ or Nd:YAG is approximately 5 and 11 W/(m*C), respectively. The first and gain elements 712a and 712b can be composed of copper, which has a thermal conductivity of approximately 390 W/(m*C), which is more than 30× greater than the gain material thermal conductivity. Since heat removal from the gain element 110 is primarily from conduction, maximizing the available surface area on the gain element 110 for conduction is important. If the gain element dimensions are 1 mm×1 mm×1 mm along the x, y, and z-direction, respectively, the arrangement depicted in FIG. 2 can contact almost 4 mm$^2$ of a total gain surface area of 6 mm$^2$. In this example, more than 50% of the total gain element surface area is in contact with a material having higher thermal conductivity.

It should be appreciated that the waste heat that needs to be removed from the gain element may be quite large. Single emitter laser diode pump sources in the 800 to 950 nm wavelength region may be capable of producing a pump beam 150 having a power greater than 5, 8, 10, or perhaps even 15 watts. If all of the pump beam is absorbed in the gain element 110 and the laser 200 is 30% efficient, then 70% of the pump beam energy is deposited in the gain element 110 and needs to be dissipated. Thus, the required waste heat dissipation can exceed 3.5, 5.5, 7.0 or 10.5 Watts. These pump beam power levels are significantly higher than those available in the 1980's and 1990's when diode-pumped lasers were first developed.

Figure 3:
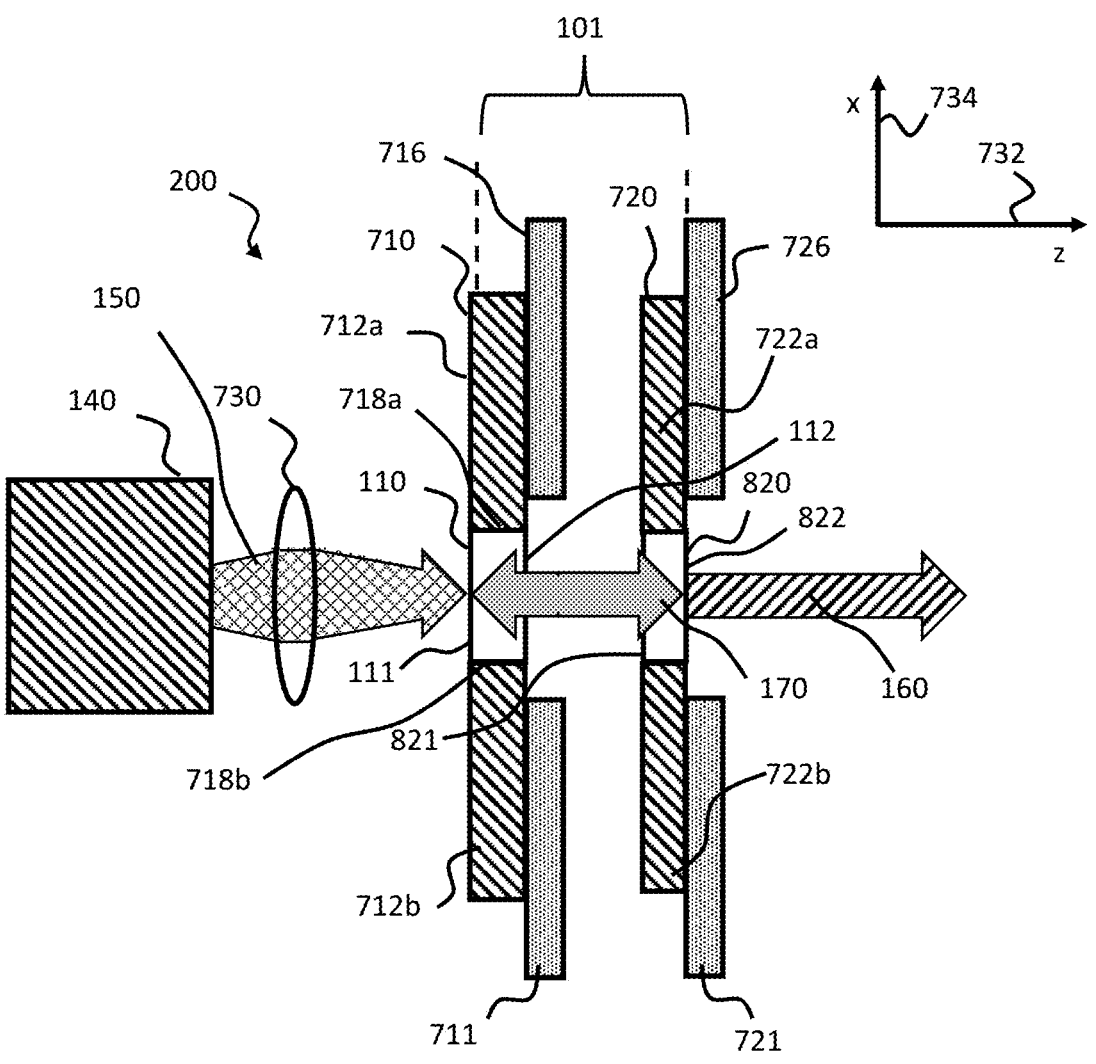
FIG. 3 is a schematic cross-sectional diagram of a laser resonator assembly according to an embodiment of the present invention.

FIG. 3 shows an alternative embodiment in which the gain joiner 716 is situated on an inboard side of the first and second gain contact elements 712a and 712b and the output coupler joiner 726 is situated on an outboard side of the first and second optical coupler contact elements 722a and 722b. Here inboard side means that the joiner is located within a length of the resonator 101 and outboard side means that the joiner is located outside of the length of the resonator 101. An advantage of the arrangement shown in FIG. 3 is that it may allow the gain element 110 and output coupler 822 to be placed closer together allowing a shorter resonator length.

In yet another embodiment, both the gain joiner 716 and the output coupler joiner 726 may be placed on the outboard side of their respective contact elements.

Figure 4:
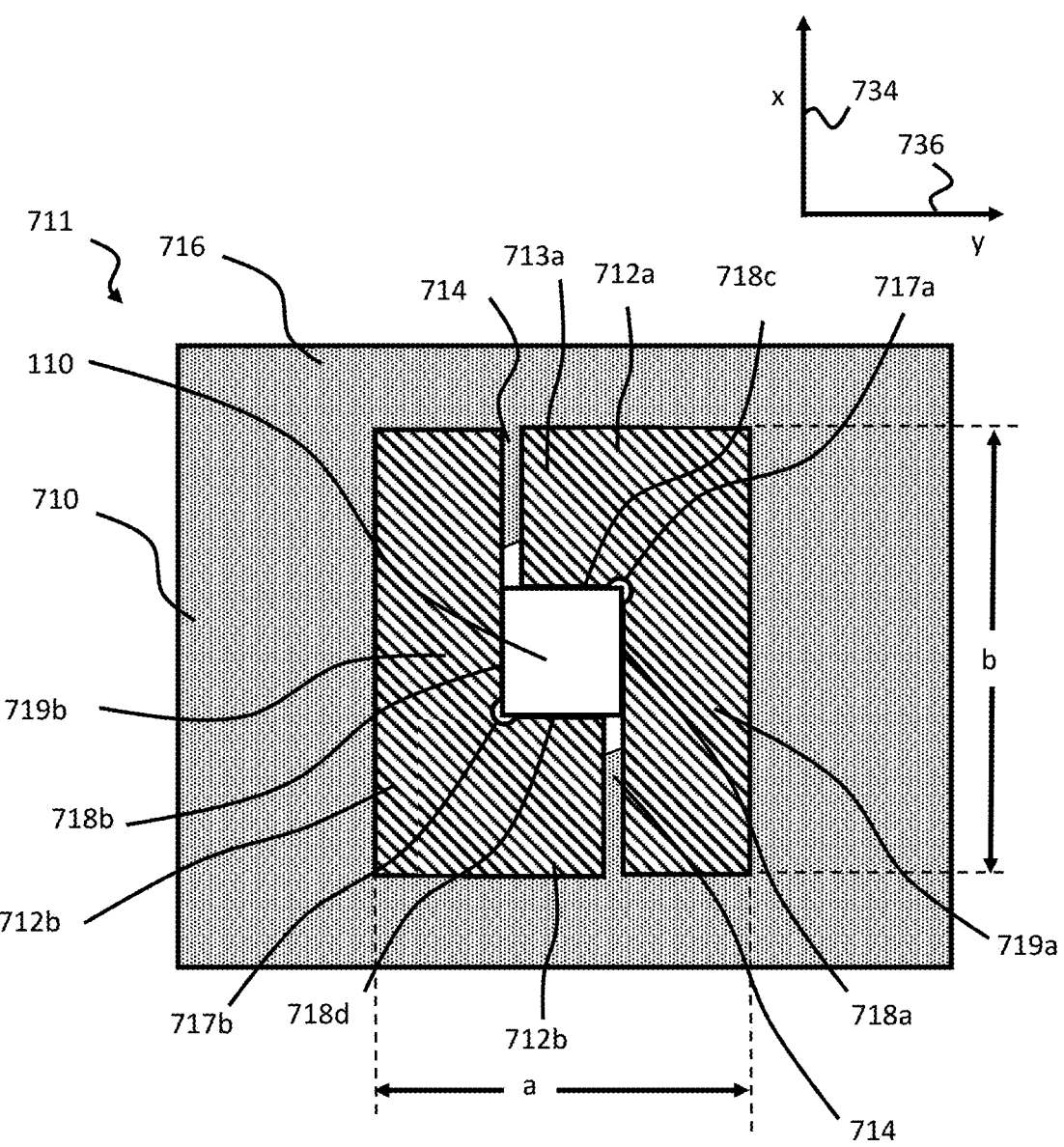
FIG. 4 is a view along a longitudinal direction of a gain element in a gain element frame according to an embodiment of the present invention.

As disclosed above, the combination of the gain element frame 710 with the mounted gain element 110 may be referred to as the gain element assembly 711, which is depicted in FIG. 4. FIG. 4 is a plan view in the x-y plane as seen along the longitudinal or z-direction. Both the first gain contact element 712a and second gain contact element 712b may have an "L-type" shape consisting of a short segment 713a or 713b and long segment 719a or 719b. The second gain contact element 712*b* may have an "L-type" shape with a short segment 713*b* and long segment 719*b*. The first gain contact element 712*a* and second gain contact element 712*b* may be substantially identical within manufacturing tolerances. The gain element 110 may fit into an internal corner of the "L" denoted by 717*a* for the first gain contact element 712*a* and 717*b* for the second gain contact element 712*b*. The short segments 713*a* and 713*b* may be deliberately undersized, that is have a length shorter than the mating gain element non-optical face 718*a* and 718*b*, respectively, so that there is a small gap 714 between the first and second gain contact elements 712*a* and 712*b*. Two gaps 714 are shown in FIG. 4. The gap 714 may be less than 10% if a length of the gain element non-optical faces 718*a* and 718*b*, so that almost all of these gain element non-optical faces are in contact with a gain contact element. The first and second gain contact elements 712*a* and 712*b* may also have small cut out areas in the internal corners 717*a* and 717*b*, respectively. By making the short segment lengths undersized and having the corner cut outs, the gain element non-optical faces 718*a*, 718*b*, 718*c*, and 718*d* can fit tightly against the mating sides of the first and second gain contact elements 712*a* and 712*b*. This arrangement allows the first gain element contact 712*a* and second gain element contact 712*b* to be snuggly pressed against all four non-optical faces 718*a*, 718*b*, 718*c*, and 718*d* of the gain element 110. Thus, all four non-optical faces 718*a*, 718*b*, 718*c*, and 718*d* of the gain element 110 provide a low thermal impedance path for heat removal, reducing the gain element's operating temperature With the gain element 110 fitted into the first gain contact element 712*a* and second gain contact element 712*b* outer edges of the first gain contact element 712*a* and second gain contact element 712*b* may extend a distance "a" in the y-direction 736. Outer edges of the first gain contact element 712*a* and second gain contact element 712*b* may extend a distance "b" in the x-direction 734. The distances a and b may be equal or different depending on the design details. The distances "a" and "b" may be small, such as less than 5 mm and preferably less than 2 or 3 mm. An important attribute of the arrangement shown in FIG. 4 is that the gain element 110 has a low impedance thermal path along all non-optical faces 718*a*, 718*b*, 718*c*, and 718*d* of the gain element 110. This helps to maximize the contact surface available for heat removal from the gain element 110 and enables symmetric cooling of the gain element 110.

As disclosed earlier, the first and second gain contact elements 712*a* and 712*b* may be attached to a gain joiner 716. The gain joiner 716 may have a central hole having an opening aligned with and larger than the gain element 110. As such, the gain joiner 716 will not obstruct the resonant light 170 (see FIG. 2). FIG. 4 shows the gain joiner 716 having a substantially rectangular outer cross-section. While this type of cross-section may be advantageous, other outer cross-sections, such as but not limited to circular or elliptical cross-sections may be used. An advantage of a rectangular cross-section is that placement of the gain element assembly 711 with an automated pick-and-place assembly tool may be readily enabled.

The output coupler 820 may be secured in an output coupler frame 720 in a manner analogous to that described for the gain element 110 to form an output coupler assembly 721 including a first and second output coupler contact elements 722*a* and 722*b* and output coupler joiner 726. For brevity a description of the similar elements in the output coupler assembly 721 will not be repeated here. A possible difference between the gain joiner 716 and output coupler joiner 726 is that the output coupler joiner 726 may be fabricated from a piezoelectric material. As such, application of an electric potential to the output coupler joiner 726 may result in a change in a length of the laser resonator. This may enable control of the axial mode structure of the laser 400.

Figure 5:
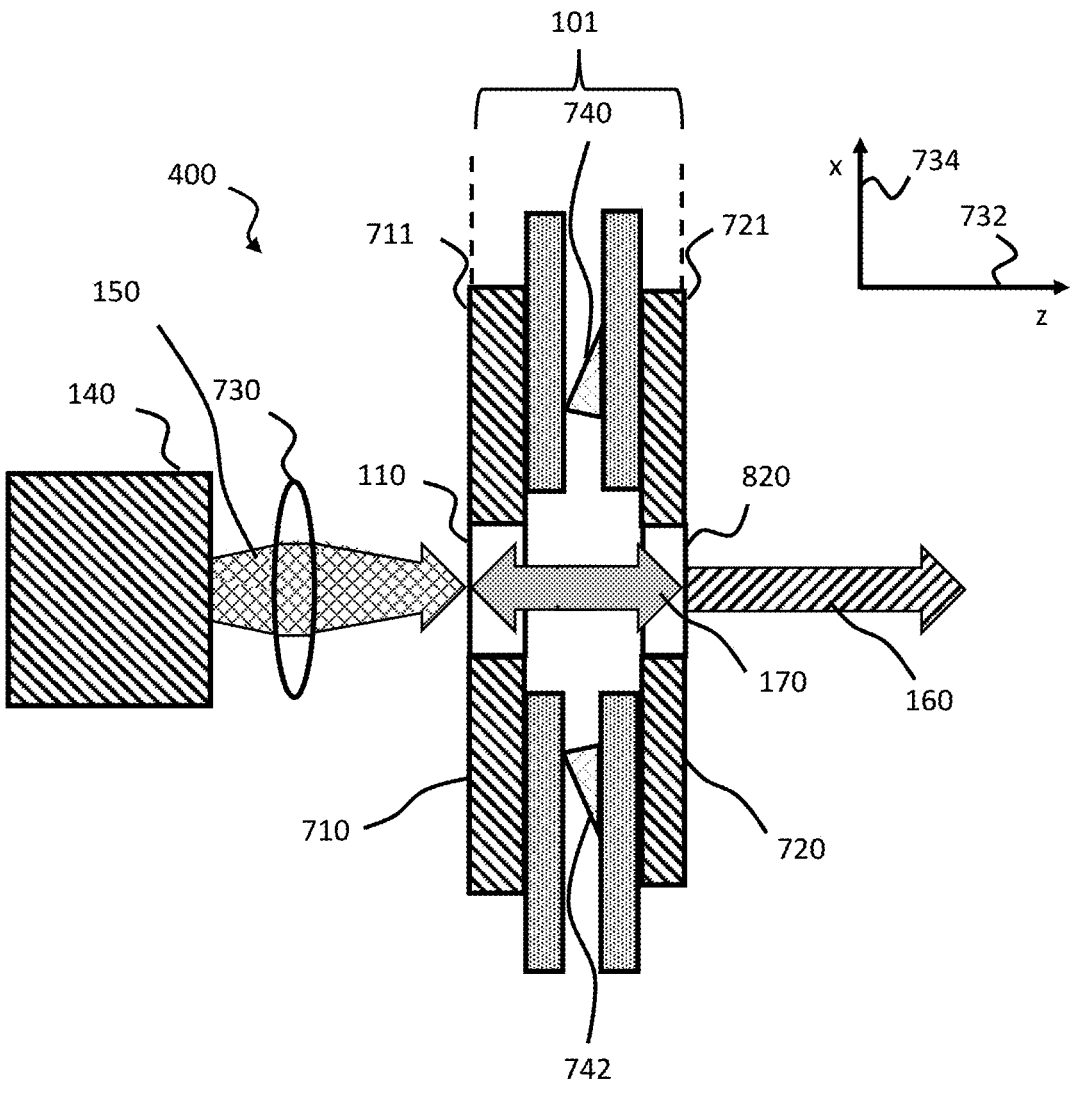
FIG. 5 is a schematic cross-sectional diagram of a laser resonator assembly with a deformable adjustment member according to an embodiment of the present invention.

The gain element assembly 711 and output coupler assembly 721 may be aligned using an adjustment member 740 as shown in FIG. 5, which depicts a laser 400. The adjustment member 740 may mechanically connect the gain element assembly 711 and the output coupler assembly 721. The adjustment member 740 may have a circular shape in the x-y plane, although this is not a requirement. In one embodiment, the adjustment member 740 is a deformable adjustment member 742, which may inelastically deform in response to force applied between the gain element assembly 711 and the output coupler assembly 721. The force may be applied in an asymmetric manner so as to change an angular alignment between the gain element 110 and the output coupler 820. Once the correct angular orientation between the gain element 110 and the output coupler 820 is achieved, the force may be removed, and the deformable adjustment member 742 may retain its shape maintaining the alignment. Optionally, the alignment may be permanently set by adding an adhesive in the gap between the gain element assembly 711 and the output coupler assembly 721 to permanently maintain the alignment.

The deformable adjustment member 742 may be fabricated from a soft metal, such as fully annealed copper, indium or an organic material, such as a polymer. The deformable adjustment member 742 may be circular in shape and have an edge that abuts one of the gain element frame 710 or the output coupler frame 720. As shown in FIG. 5, the edge abuts the gain element frame 710. The deformable adjustment member 742 may have a broad flat surface opposite the edge. In other embodiments, the deformable adjustment member 742 may be a simple ring with two flat surfaces that abut the gain element frame 710 and the output coupler frame 720.

Figure 6:
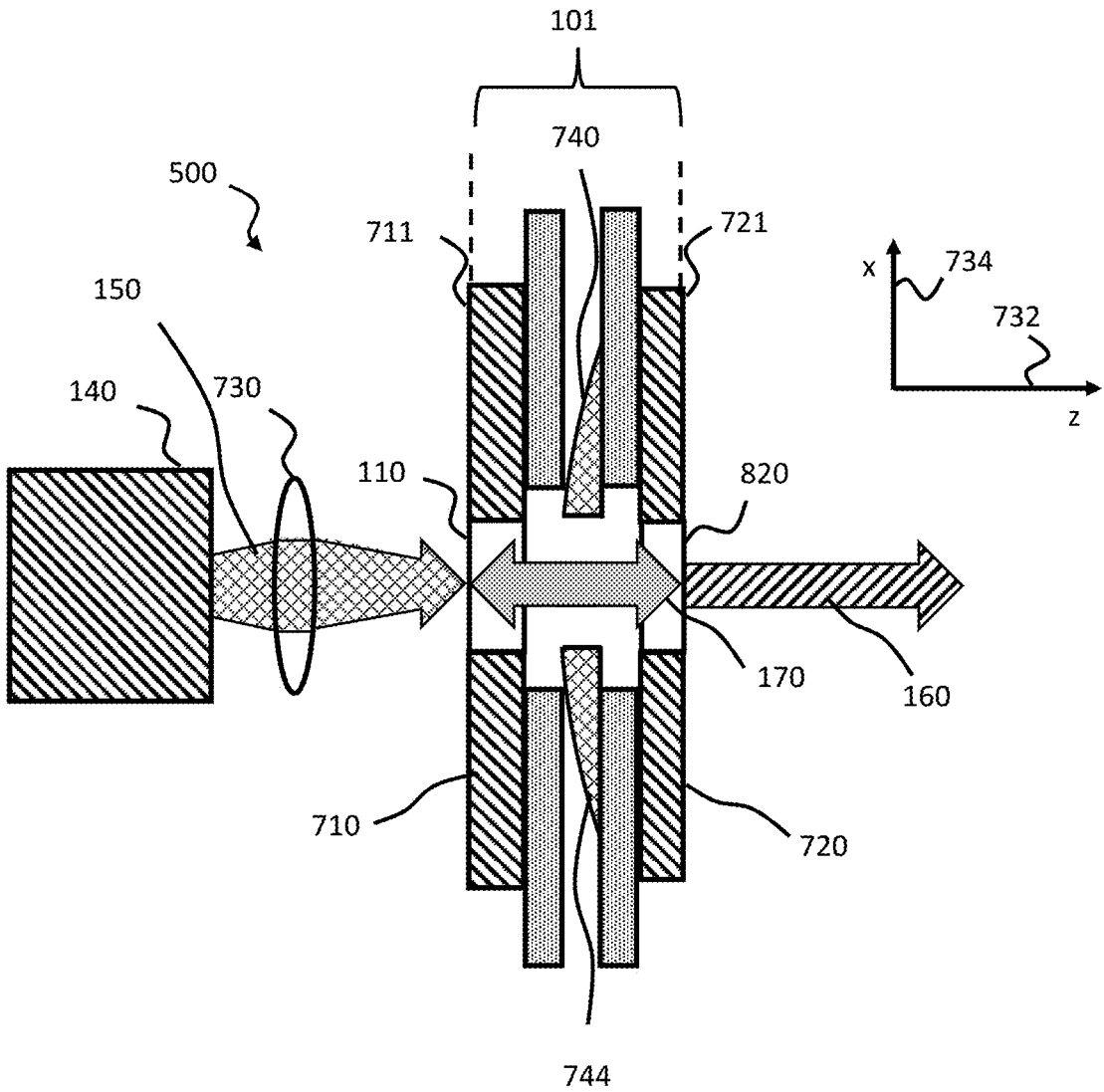
FIG. 6 is a schematic cross-sectional diagram of a laser resonator assembly with a rigid adjustment member according to an embodiment of the present invention.

In an alternative embodiment, a laser 500 may have the adjustment member 740 be a mechanically rigid adjustment member 744. The rigid adjustment member 744 may have a curved surface facing one of the gain element frame 710 or the output coupler frame 720 as shown in FIG. 6. The curved surface may be spherical so that the curved surface may be in continuous contact with one of the gain element frame 710 or the output coupler frame 720 as the angular alignment between them is adjusted. Alternatively, the rigid adjustment member 744 may be a ring and one or both of the gain joiner 716 or output coupler joiner 726 are composed of a deformable material into which the rigid adjustment member is pressed deforming one or both of the joiners. Once correct alignment has been obtained, the alignment can be permanently affixed by inserting an adhesive into the gap between the gain element frame 710 and the output coupler frame 720 outside of the mechanically rigid adjustment member 744.

FIG. 7 is a flow diagram 600 showing a method of aligning a resonator to form a resonator assembly according to an embodiment of the current invention. In steps 602 and 604 the gain element assembly 711 and output coupler assembly 721 are assembled, respectively, as previously disclosed. A first end of the laser resonator is on a surface of the gain element and a second end of the laser resonator is on a surface of the output coupler. The order of assembly between the gain element assembly 711 and output coupler assembly 721 is unimportant. In step 606, the gain element assembly 711 and output coupler assembly 721 are placed in an alignment fixture with the adjustment member 740 situated between them as depicted in FIGS. 5 and 6. In step 608, an alignment laser beam generated by an alignment laser is directed through the gain element 110 and output coupler 820. In step 610, the gain element assembly 711 and output coupler assembly 721 may be angularly adjusted so that the first and second ends of the resonator are parallel to each other. This may be achieved by aligning a first reflection off the first surface 111 of the gain element 110 and a second reflection off the second surface 822 of the output coupler 820 so they are coincident. In other words, spots produced by the first reflection and second reflection on a camera or other detection device spatially overlap. In step 612, the angular orientation obtained in step 610 is permanently affixed by placing an adhesive between the gain element assembly 710 and output coupler assembly 720 or by some other means, such as but not limited to spot welding and soldering. In step 614, the completed resonator assembly is removed from the alignment fixture. An automated system may perform all of the method steps to enable low-cost manufacturing. The resonator assembly is ready to be integrated with a pump source 140 and optional focusing lens 730 to complete the laser assembly process.

In order to facilitate the assembly method 600 described relative to FIG. 7, it is advantageous if the second surface 112 of the gain element 110 and the first surface 121 of the output coupler 820 have a reflectivity at the alignment wavelength less than the coatings that form the first and second ends of the resonator, i.e. the high reflection coating on the first surface 111 of the gain element 110 and the partially transmissive output coupler coating on the second surface 822 of the output coupler 820. In some embodiments, the second surface 112 of the gain element 110 and the first surface 121 of the output coupler 820 may be anti-reflection coated at the alignment wavelength. An anti-reflection coating at the alignment laser wavelength may have a reflectivity less than 2%, 1%, 0.5%, or 0.1% at that wavelength. By adjusting the reflectivity of the coatings on the second surface 112 of the gain element 110 and first surface 121 of the output coupler 820 as described above, it is easier to make the angular adjustment described in FIG. 7, since reflected spots of alignment laser light from these surfaces will have a low intensity and the reflected spots from the first surface 111 of the gain element 110 and second surface 822 of the output coupler 820, will be more easily discernible.

The resultant resonator assembly may be quite small having dimensions of less than 5 or 10 mm on all sides and in some embodiments having dimensions less than 3 mm on each side. Referring back to FIGS. 2, 3, 5, 6, the laser resonator assembly must now be integrated with a pump source 140 and an optional focusing lens 730 to complete the laser 200, 400 or 500. The pump source 140 may be a semiconductor diode laser of either an edge-emitting or surface-emitting variety. The pump source may be wavelength locked with a grating. If the pump source 140 is an edge-emitting semiconductor laser, the focusing lens 730 may have anamorphic correction so as to create a substantially circular pump spot in the gain element 110. The focusing lens may be formed from a plurality of individual lens. No precise positional or angular alignment is required between these components, and they may be assembled using a conventional pick-and-place tool that places the components on a small flat bench or substrate. For example, component positional placement accuracy may be within ±25 microns and component angular placement accuracy may be within ±10 mrad. These values are exemplary only and the exact values will depend on the detailed laser design.

The laser may be placed in a package, such as a windowed TO (transistor outline) package or a butterfly package. Optics to collimate and/or redirect the output beam 160 may also be placed in the package. The package may be temperature controlled using a heater or thermoelectric cooler, which may be either internal or external to the package.

Figure 8:
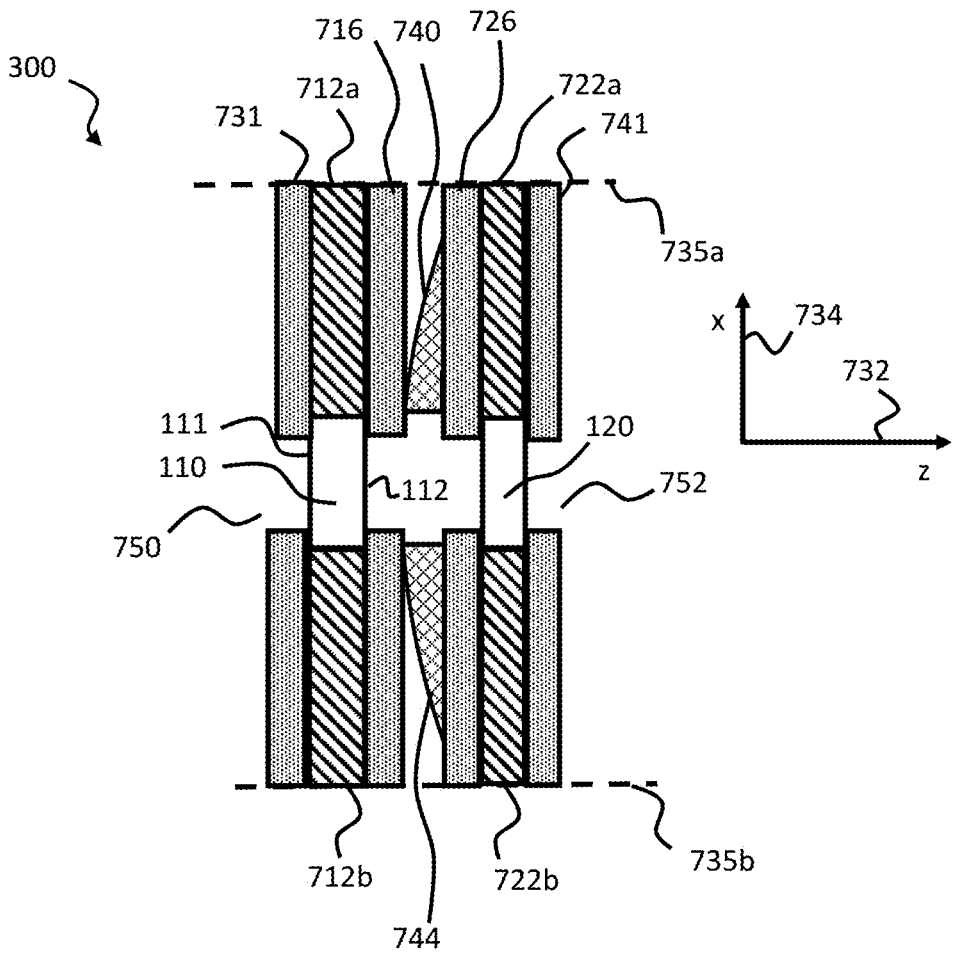
FIG. 8 is a schematic cross-sectional diagram of a resonator assembly with a gain element cap plate and an output coupler cap plate according to an embodiment of the present invention.

FIG. 8 shows a resonator assembly 300 cross-section according to an embodiment of the current invention. The resonator assembly 300 is similar to the resonators shown in FIGS. 2, 3 and 6 in having first and second gain element contact elements 712a and 712b and first and second output coupler contact elements 722a and 722b. Resonator assembly 300 also uses a mechanically rigid adjustment member 744 as shown in FIG. 5, but a deformable adjustment member 742 could be used instead. Additionally, resonator assembly 300 may include a gain element cap plate 731 and an output coupler cap plate 741. The gain element cap plate 731 may be secured to the gain contact elements 712a and 712b. Likewise, the output coupler cap plate 741 may be secured to the output coupler contact elements 722a and 722b. The gain element cap plate 731 and the output coupler cap plate 741 may both have an aperture 750 and 752, respectively. The apertures 750 and 752 may be the same size as or larger than the hole in the gain joiner 716 and the output coupler joiner 726. The gain element cap plate aperture 750 may be sized as small as possible without substantially clipping the pump beam 150 (not shown in FIG. 8, see FIG. 6). Such an arrangement will minimize the thermal resistance between a pump volume in the gain element 110 and the gain element cap plate 750. The apertures and holes may be aligned with the gain element 110 and output coupler 820, respectively. The holes in the gain joiner 716 and output coupler joiner 726 may be several times larger, for example, four or five times larger than a beam size of the resonant light 170 (see FIG. 6) so that optical losses of the resonant light 170 due to the gain joiner 716 and the output coupler joiner 726 are negligible compared to other cavity losses. Alternatively, one or both holes in the gain joiner 716 and output coupler joiner 726 may be between two to four times larger than the beam size of the resonant light 170. In this arrangement, the holes may serve as a spatial filter producing sufficient loss for higher order transverse modes to prevent them from lasing and thus support single transverse mode operation of the resonator assembly 300.

Additionally, all the elements of the resonator assembly 300, except the gain element 110, the output coupler 820 and the adjustment member 740, may substantially extend to a perimeter surface 735a or 735b. The perimeter surface 735a or 735b may lie in a common plane having a surface normal perpendicular to a lasing direction of the laser resonator assembly within manufacturing tolerances. This facilitates contacting all these elements to a heat sink or heat exchanger (not shown in FIG. 8), which may improve removal of waste heat from the gain element 110 and the output coupler 820. This may be especially important if the output coupler 820 is also a saturable absorber element. In other embodiments, not all the ends in the x- or y-direction need terminate on a common plane.

Figure 9:
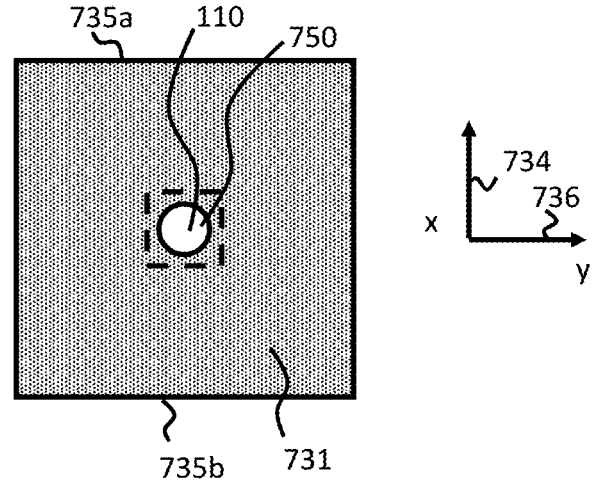
FIG. 9 is a view along a longitudinal direction of the resonator assembly shown in FIG. 8 according to an embodiment of the present invention.

The arrangement shown in FIG. 8 mechanically captures the gain element 110 and output coupler 820. The aperture 750 may be circular such that the corners of the gain element 110 and output coupler 820 are captured by the gain element cap plate 731 and output coupler cap plate 741. In some embodiments, only the corners are captured. FIG. 9, shows an end view along the z-direction of the resonator assembly of FIG. 8. The gain element 110 is visible in the aperture 750 of the gain element cap plate 731.

The gain contact elements 712*a* and 712*b* may be slightly thinner in the z-direction than the gain element 110. This allows both the gain contact elements 712*a* and 712*b* and the gain element cap plate 731 to make robust mechanical contact with the optical faces 111 and 112 of the gain element 110. This provides for an increased contact area between the gain element 110 and surrounding elements that have higher thermal conductivity. If the gain element 110 is a 1 mm cube and the aperture 750 in the gain element cap plate 731 is 0.4 mm and the hole in gain element joiner 716 is also 0.4 mm, then the total contact surface area of the gain element is approximately 4.7 mm$^2$ or more than 75% of the available gain element surface area. This larger percentage of contact surface area is achieved by contacting both the optical and non-optical surfaces of the gain element 110.

Although only a few embodiments of the invention have been described in detail, it should be appreciated that the invention may be implemented in many other forms without departing from the spirit or scope of the invention. For example, the gain element frame 710 may be formed from a monolithic unitary structure with a rectangular through hole located in the center of the structure. In this embodiment, a joiner may not be necessary. In yet another alternative embodiment, the gain element frame 710 may have a U-shaped first gain contact element 712*a* and a rectangular parallelopiped shaped second gain contact element 712*b*. The gain element 110 may be situated between the legs of the U shape, which are slightly undersized so that the gain element 110 extends past the U legs. This enables robust contact of the second gain contact element 112*b* with a non-optical face of the gain element 110. This arrangement provides a low impedance thermal path along two non-optical faces of the gain element 110, since the first and second gain contact elements can be pressed against two opposing non-optical faces of the gain element 110. Also, heat transfer can occur through non-optical faces of the gain element adjacent the legs of the U shape, although a least one of these paths may have a higher thermal impedance, since it may be difficult to consistently obtain robust contact along both legs of the U shape.

In a further alternative embodiment, the first and second gain contact elements 712*a* and 712*b* may both be rectangular parallelepipeds. In this embodiment, each of the first and second gain contact elements 712*a* and 712*b* will only contact a single non-optical face of the gain element 110 and there will be a low impedance thermal path from two opposing non-optical faces of the gain element 110.

In still other embodiments, a transparent, thermally conductive window, such as a sapphire window, may be placed adjacent to the first surface 111 of the gain element 110 to further improve cooling of the gain element 110. Similarly, a transparent, thermally conductive window, such as a sapphire window, may be placed adjacent to the second surface 822 of the output coupler 820 to further improve cooling of the output coupler 820. In this manner, the gain element cap plate 731 and output coupler cap plate 741 may not have a hole, but may be a solid block of transparent, thermally conductive material. Also, while the adjustment member 740 is shown as a separate part from the gain joiner 716 and the output coupler joiner 726 the adjustment member 740 may be integrated into one of these components to form a unitary structure. In some other embodiments, the first and second gain contact elements 712*a* and 712*b* may not be permanently affixed to the gain joiner 716 but may be elastically loaded, for example by a spring, so that they are pressed into the gain element 110. A similar arrangement may be used to secure the output coupler 820.

The invention has been described primarily as either a passively Q-switched laser or FMCW laser that may be applied to laser ranging applications, but the invention is not so limited. The laser and resonator systems and assembly methods described herein may be used for any laser resonator cavity having a first and second end. The laser may be used in any application, not just laser ranging. In some embodiments, little or no heat is dissipated in the output coupler and an output coupler frame is not required to dissipate heat. In this embodiment, only the gain element need be secured in a gain element frame. In other embodiments, an intracavity element may be inserted within the resonator. The intracavity element may provide various functions such as, but not limited, to polarization control, axial mode control, transverse mode control, frequency tuning, and second harmonic generation. The laser may operate at any lasing wavelength where the gain element has suitable gain to enable lasing. For example, lasing wavelength may be between 0.9 to 2.5 microns. Therefore, the present embodiments should be considered illustrative and not restrictive, and the invention is not to be limited to the details given herein.

What is claimed is:

1. A laser resonator assembly comprising:
a gain element having a first and a second surface,
a first end of the resonator formed by a highly reflective coating at a lasing wavelength on the first surface of the gain element;
an output coupler having a first and second surface;
a second end of the resonator formed by a partially transmitting optical coating at the lasing wavelength on the second surface of the output coupler;
a gain element frame that secures the gain element to form a gain element assembly;
an output coupler frame, separate and distinct from the gain element frame, that secures the output coupler to form an output coupler assembly; and
a gain element cap plate, wherein the gain element cap plate includes an aperture configured to transmit a pump beam without substantially clipping the pump beam.

2. The laser resonator assembly as recited in claim 1, wherein the output coupler is a saturable absorber element.

3. The laser resonator assembly as recited in claim 1, wherein the gain element frame comprises:
a first gain contact element that contacts the gain element along a first non-optical face of the gain element,
a second gain contact element that contacts the gain element along a second non-optical face of the gain element, the second non-optical face opposed to the first non-optical face, and
a gain joiner that secures the first gain contact element and the second gain
contact element together.

4. The laser resonator assembly as recited in claim 3, wherein the first gain contact element and the second gain contact element are identical.

5. The laser resonator assembly as recited in claim 3, wherein the first gain contact element and the second gain contact element have a "L-type" shape consisting of a short segment and long segment, wherein a first corner of the gain element fits into an internal corner of the "L" of the first gain contact element and a second corner of the gain element into an internal corner of the "L" of the second gain contact element.

6. The laser resonator assembly as recited in claim 3, wherein the first gain contact element has a "U-type" shape consisting of a long segment with two short segments at opposed ends of the long segment and the second gain contact element is a rectangular parallelepiped.

7. The laser resonator assembly as recited in claim 3, wherein the first gain contact element and the second gain contact element are rectangular parallelepipeds.

8. The laser resonator assembly as recited in claim 3, wherein a thickness of the first and second gain contact elements is in a range between approximately the thickness of the gain element to twice the thickness of the gain element.

9. The laser resonator assembly as recited in claim 1, further comprising an adjustment member.

10. The laser resonator assembly as recited in claim 9, wherein the adjustment member is situated between the gain element assembly and the output coupler assembly.

11. The laser resonator assembly as recited in claim 9, wherein the adjustment member is a deformable adjustment member configured to adjust an angular alignment between the first end of the resonator and the second end of the resonator.

12. The laser resonator assembly as recited in claim 9, wherein the adjustment member is a mechanically rigid adjustment member having a curved surface facing one of the gain element assembly or the output coupler assembly.

13. The laser resonator assembly as recited in claim 1, wherein an outer surface of the gain element assembly and an outer surface of the output coupler assembly form a common plane having a surface normal perpendicular to a lasing direction of the laser resonator assembly.

14. The laser resonator assembly as recited in claim 13, wherein the common plane is in contact with a heat sink or heat exchanger.

15. The laser resonator assembly as recited in claim 1, further comprising an output coupler cap plate, wherein the output coupler cap plate includes an aperture.

16. The laser resonator assembly as recited in claim 1, wherein the second surface of the gain element has an anti-reflection coating at the laser wavelength and the first surface of the output coupler has an anti-reflection coating at the laser wavelength and a reflectivity of the anti-reflection coatings on the second surface of the gain element and the first surface of the output coupler at an alignment wavelength is less than a reflectivity at the alignment wavelength of the coatings that form the first and the second ends of the resonator.

17. A laser comprising:

the laser resonator assembly as recited in claim 1;

a pump source; and a focusing lens.

18. A method of assembly of a laser resonator assembly comprising:

assembling a gain element assembly from a gain element and a gain element frame, wherein a first end of a laser resonator is on a first surface of the gain element;

assembling an output coupler assembly from an output coupler and an output coupler frame, wherein a second end of the laser resonator is on a second surface of the output coupler;

placing the gain element assembly and the output coupler assembly in an alignment fixture with an adjustment member mechanically connecting the gain element assembly and the output coupler assembly;

adjusting an angular alignment between the gain element and the output coupler so that the first end of the laser resonator is parallel to the second end of the laser resonator; and permanently affixing the gain element assembly and the output coupler assembly in this alignment.

19. The method as recited in claim 18, wherein the angular alignment is adjusted by aligning reflected spots from an alignment laser operating at an alignment wavelength from the first surface of the gain element and the second surface of the output coupler so that they are coincident on a detection device.

* * * * *